US 011247539B2

(12) United States Patent
Oki et al.

(10) Patent No.: US 11,247,539 B2
(45) Date of Patent: Feb. 15, 2022

(54) WINDSHIELD WITH MOLDING AND CONNECTIVE STRUCTURE FOR COWL LOUVER AND WINDSHIELD WITH MOLDING

(71) Applicant: AGC Inc., Tokyo (JP)

(72) Inventors: Eiji Oki, Tokyo (JP); Takafumi Inoue, Tokyo (JP); Takashi Kawahara, Tokyo (JP); Takashi Shimada, Tokyo (JP)

(73) Assignee: AGC INC., Tokyo (JP)

( * ) Notice: Subject to any disclaimer, the term of this patent is extended or adjusted under 35 U.S.C. 154(b) by 180 days.

(21) Appl. No.: 16/662,985

(22) Filed: Oct. 24, 2019

(65) Prior Publication Data

US 2020/0055377 A1     Feb. 20, 2020

Related U.S. Application Data

(63) Continuation of application No. PCT/JP2018/016273, filed on Apr. 20, 2018.

(30) Foreign Application Priority Data

Apr. 28, 2017   (JP) .............................. JP2017-090201

(51) Int. Cl.
*B60J 1/02* (2006.01)
*B60J 1/00* (2006.01)
(Continued)

(52) U.S. Cl.
CPC ................. *B60J 1/02* (2013.01); *B60J 1/001* (2013.01); *B60J 1/006* (2013.01); *B62D 25/081* (2013.01); *B60J 10/70* (2016.02)

(58) Field of Classification Search
CPC ... B60J 1/001; B60J 1/006; B60J 1/004; B60J 1/06; B60J 1/02
(Continued)

(56) References Cited

U.S. PATENT DOCUMENTS 6,769,700 B2   8/2004   Ortmuller et al.
7,182,397 B1 *  2/2007   Desai ................... B62D 25/081
                                                           296/192

(Continued)

FOREIGN PATENT DOCUMENTS

DE         20008555 U1     8/2000
JP         H05-97061 A     4/1993
(Continued)

OTHER PUBLICATIONS

International Searching Authority, "International Search Report," issued in connection with International Patent Application No. PCT/JP2018/016273, dated May 29, 2018.
(Continued)

*Primary Examiner* — Jason S Morrow
(74) *Attorney, Agent, or Firm* — Foley & Lardner LLP

(57) ABSTRACT

A molding includes a first molding portion having an upper surface bonded to an inner side surface of a windshield, a second molding portion, and a third molding portion extending from the second molding portion so as to extend along an imaginary extension of an outer side surface of the windshield. The third molding portion is formed in a rectangular shape in longitudinal section and has an upper surface disposed at a lower position than the imaginary extension of the outer side surface of the windshield.

5 Claims, 11 Drawing Sheets

(51) Int. Cl.
    *B62D 25/08* (2006.01)
    *B60J 10/70* (2016.01)
(58) Field of Classification Search
    USPC ....................................................... 296/96.21
    See application file for complete search history.

(56) References Cited

U.S. PATENT DOCUMENTS

| | | | |
|---|---|---|---|
| 8,628,137 | B2 | 1/2014 | Platt et al. |
| 2003/0057660 | A1 | 3/2003 | Ortmuller et al. |
| 2014/0332519 | A1* | 11/2014 | Sakamoto ............... B60J 10/70 219/203 |
| 2015/0091331 | A1* | 4/2015 | Takei ..................... B60R 21/34 296/192 |
| 2015/0328963 | A1* | 11/2015 | Lee ......................... B60J 1/02 296/192 |
| 2016/0176276 | A1* | 6/2016 | Sanada .................. B60J 10/30 296/96.21 |
| 2016/0280275 | A1* | 9/2016 | Takahashi .............. B62D 25/14 |
| 2017/0028832 | A1* | 2/2017 | Sekishiro ................. B60J 1/02 |
| 2018/0297459 | A1* | 10/2018 | Oki .......................... B60J 1/02 |

FOREIGN PATENT DOCUMENTS

| | | | | |
|---|---|---|---|---|
| JP | H11-300773 | A | | 11/1999 |
| JP | 2003-532574 | A | | 11/2003 |
| JP | 2011-520694 | A | | 7/2011 |
| JP | 2016030474 | A | * | 3/2016 |
| KR | 20160055323 | A | * | 5/2016 ........... B62D 25/081 |
| WO | WO-2015/033202 | A1 | * | 3/2015 ............... B60J 1/02 |
| WO | WO-2015/181960 | A1 | | 12/2015 |

OTHER PUBLICATIONS

International Searching Authority, "Written Opinion," issued in connection with International Patent Application No. PCT/JP2018/016273, dated May 29, 2018.

* cited by examiner

WINDSHIELD WITH MOLDING AND CONNECTIVE STRUCTURE FOR COWL LOUVER AND WINDSHIELD WITH MOLDING

CROSS-REFERENCE TO RELATED PATENT APPLICATIONS

This application is a continuation of PCT Application No. PCT/JP2018/016273, filed on Apr. 20, 2018, which is based upon and claims the benefit of priority from Japanese Patent Application No. 2017-090201 filed on Apr. 28, 2017. The contents of those applications are incorporated herein by reference in their entireties.

TECHNICAL FIELD

The present invention relates to a windscreen with a molding and a connecting structure for a cowl louver and a windshield with a molding.

BACKGROUND ART

Patent Document 1 discloses a cowl louver which clamps a lower edge portion of an automobile windscreen (windshield). The cowl louver has a clamping portion formed in a substantially U-shape in section in a windshield-side edge portion (rear end portion) thereof, the clamping portion including a clamping edge portion and clamping members. The cowl louver also includes a main body inner layer which is made of a hard synthetic resin.

Explanation will be made about a connection work for connecting the cowl louver of Patent Document 1 to a windshield. The windshield is mounted to a window frame of a vehicle body prior to the connection work for the cowl louver. The clamping portion of the cowl louver is brought closer to the lower edge portion of the windshield. Then, the clamping members of the cowl louver have top surfaces brought into contact with a lower edge of the windshield, and the cowl louver is moved upward so as to clamp the windshield between the clamping edge portion and the clamping members. This connection work causes the clamping members to be elastically deformed with respect to the clamping edge portion, with the result that the windshield is clamped between the clamping edge portion and a supporting portion. Thus, the cowl louver is connected to the windshield.

In Description, the wordings "upward" and "downward" mean an upward direction and a downward direction of an vehicle body, and the wordings "forward" and "backward" mean a forward direction and a backward direction of the vehicle body. An assemblage wherein a molding is assembled to a lower edge portion of a windshield is called a windshield with a molding, and a structure wherein a cowl louver is connected to a windshield via the molding is called a connecting structure for a cowl louver and a windshield with a molding. The windshield is made of laminated glass wherein at least two glass plates are bonded via an interlayer made of PVB (Polyvinyl butyral), EVA (Ethylene-Vinyl Acetate) or the like.

Patent Document 2 discloses a connecting structure for a cowl louver and a windshield with a molding, wherein a windscreen (windshield) has a lower edge portion connected to a water draining chamber (cowl louver) via a contoured structure (molding). In the connecting structure for a cowl louver and a windshield with a molding according to Patent Document 2, the cowl louver has an upper surface formed so as to be flush with an outer side surface of the windshield.

The water draining chamber according to Patent Document 2 includes a first segment and a second segment. The first segment has a surface for affixation to a windshield, and the fixing surface is bonded to an inner side surface of the windshield via a double sided tape. The second segment has a snap-in recess which is engageable with or disengageable from the cowl louver.

The cowl louver according to Patent Document 2 has a rib formed on a lower surface, and the rib is engaged with or fitted into the snap-in recess of the water draining chamber. The snap-in recess of the water draining chamber is bounded by a substantially L-shaped, U-shaped or hook-like resilient leg and by a bearing rib subtended by the first segment and the second segment. The free end of the resilient leg and the bearing rib subtend an engagement aperture for engagement with the rib of the cowl louver. The cross-section of the bearing rib of the cowl louver is wedge-shaped and/or T-shaped.

PRIOR ART DOCUMENT

Patent Document

Patent Document 1: JP-A-H5-97061
Patent Document 2: JP-A-2011-520694

DISCLOSURE OF INVENTION

Technical Problem

The windshield with a molding, and the connecting structure for a cowl louver and a windshield with a molding disclosed in Patent Documents 1 and 2 cause the following problems.
[Problems of Abnormal Noise and Glass Breakage]
The structure of Patent Document 1 includes no molding. When a foreign matter (granular foreign matter, such as sand) enters in between the hard clamping portion of the cowl louver and the lower edge portion of the windshield, there has been caused a problem that abnormal noise (rubbing noise caused between the windshield and the foreign matter) is generated during vehicle running. When a foreign matter enters in between the clamping portion of the cowl louver and the lower edge portion of the windshield, vibrations or the like generated during vehicle running could cause the foreign matter to be rubbed with the windshield to scratch a surface of the windshield. When a surface of the windshield is scratched, the windshield could be broken, starting with the scratch.
[Problem of Workability in Connection]
The structure according to Patent Document 2 has a problem that it is uneasy to connect a cowl louver to a windshield.

Specifically, the connection work for connecting a cowl louver to a windshield is normally carried out in such a state that the windshield is mounted to a window frame of a vehicle body prior to the connection work as described in Patent Document 1. In the structure according to Patent Document 2, it is necessary to carry out a work for successively engaging the rib of the cowl louver with the snap-in recess of the molding while a worker moves along a lower edge portion of the windshield. This creates a problem that the presence of the vehicle body disturbs the movement of the worker to provide poor workability in the connection.

[Problem of Stop Position of Wiper]

It has been recently desired that even when a pedestrian or the like collides with an automobile and hits his or her head or the like against a portion of a windshield close to its lower edge portion, the stop position of a wiper is set at a position closer to a lower edge portion of the windshield than before to reduce the possibility that the pedestrian could hit his or her head or the like against the wiper. The structure according to Patent Document 1 has a problem that it is impossible to set the stop position of a wiper at a position closer to a lower edge portion of the windshield than before because the connection portion between the lower edge portion of a windshield and the rear end portion of a cowl louver protrudes toward a vehicle exterior direction from an outer side surface of the windshield.

[Problems of Production Accuracy for Each of Molding and Cowl Louver]

In the structure according to Patent Document 2, the rib of the cowl louver and the snap-in recess of the molding are formed in an extremely complicated shape, and the cowl louver and the molding are produced by resin molding, which is difficult to achieve good dimensional accuracy. Since the cowl louver and the molding according to Patent Document 2, which are formed in an extremely complicated shape, are difficult to be produced with good accuracy, the structure according to Patent Document 2 has a problem that it is difficult to connect the cowl louver to the molding with good accuracy.

As described above, it has been desired to provide a novel windshield with a molding, which is capable of simultaneously solving the problems of abnormal noise and glass breakage caused by a foreign matter, and the problem of workability in connection of a cowl louver to a windshield.

It has been also desired to provide a novel connecting structure for connecting a cowl louver to a windshield with a molding, which is capable of simultaneously solving the problem of the stop position of a wiper and the problem of production accuracy for each of a molding and a cowl louver, in addition to the just above-mentioned problems.

The present invention is provided, taking the above-mentioned circumstances into consideration. It is an object of the present invention to provide a novel windshield with a molding, which is capable of simultaneously solving the problems of abnormal noise and glass breakage caused by a foreign matter, and the problem of workability in connection of a cowl louver to a windshield, and a novel connecting structure for connecting a cowl louver to a windshield with a molding, which is capable of simultaneously solving the problem of the stop position of a wiper and the problem of production accuracy for each of a molding and a cowl louver.

Solution to Problem

The windshield with a molding according to the present invention is a windshield with a molding, which includes laminated glass having a first glass plate to be disposed on an outer side of a vehicle body, a second glass plate to be disposed on an inner side of the vehicle body and an interlayer bonding the first glass plate and the second glass plate; and a molding disposed on a lower edge portion of the laminated glass, wherein the molding includes a first molding portion having an upper surface bonded to an inner side surface of the second glass plate, a second molding portion extending from the first molding toward an upward direction and along an end surface of the lower edge portion of the laminated glass, and a third molding portion extending from the second molding portion in a forward direction of the vehicle body, and wherein the third molding portion has an upper surface disposed at a lower position than an imaginary extension of an outer side surface of the first glass plate.

In a one mode of the present invention, it is preferred that the third molding portion be disposed along the end surface of the lower edge portion of the laminated glass and include a first spacer softer than the molding, the first spacer having an upper surface formed so as to be flush with the outer side surface of the first glass plate.

In another mode of the present invention, it is preferred that the third molding portion have a lower inner side end surface formed in a curved shape in section.

In another mode of the present invention, it is preferred that the first molding portion have a second spacer formed on a lower surface thereof so as to be brought into contact with the vehicle body, the second spacer being softer than the molding.

In another mode of the present invention, it is preferred that the third molding portion have an engaging portion formed on an upper surface or a lower surface.

The connecting structure for a cowl louver and a windshield with a molding according to the present invention includes the windshield with a molding according to the present invention, and a cowl louver having a rear end portion engageable with the third molding portion of the molding of the windshield with a molding, the rear end portion being formed in a U-shape in longitudinal section, wherein the rear end portion of the cowl louver has an upper surface formed so as to be flush with an imaginary extension of an outer side surface of the first glass plate of the laminated glass.

The connecting structure for a cowl louver and a windshield with a molding according to the present invention includes the windshield with a molding according to the present invention, and a cowl louver having a rear end portion engageable with the third molding portion of the molding of the windshield with a molding, the rear end portion being formed in a U-shape in longitudinal section, wherein the rear end portion of the cowl louver has an upper surface formed so as to be flush with an imaginary extension of the outer side surface of the first glass plate of the laminated glass, and wherein the first spacer is interposed between the rear end portion of the cowl louver and the laminated glass.

The connecting structure for a cowl louver and a windshield with a molding according to the present invention may include the windshield with a molding according to the present invention, and a cowl louver having a rear end portion engageable with the third molding portion of the molding of the windshield with a molding, the rear end portion being formed in a U-shape in longitudinal section, wherein the rear end portion of the cowl louver has an upper surface formed so as to be flush with an imaginary extension of the outer side surface of the first glass plate of the laminated glass, and wherein the rear end portion of the cowl louver has an engaging portion formed thereon, the engaging portion being to be engaged with an engaged portion of the third molding of the molding.

Advantageous Effects of Invention

In accordance with the present invention, it is possible to provide, it is possible to provide a novel windshield with a molding, which is capable of simultaneously solving the problems of abnormal noise and glass breakage caused by a foreign matter, and the problem of workability in connection of a cowl louver to a windshield. In accordance with the connecting structure for connecting a cowl louver to a windshield with a molding of the present invention, it is possible to simultaneously solve the problems of abnormal noise and glass breakage caused by a foreign matter, the problem of workability in connection of a cowl louver to a windshield, the problem of the stop position of a wiper and the problem of production accuracy for each of a molding and a cowl louver.

DESCRIPTION OF EMBODIMENTS

Figure 1A:
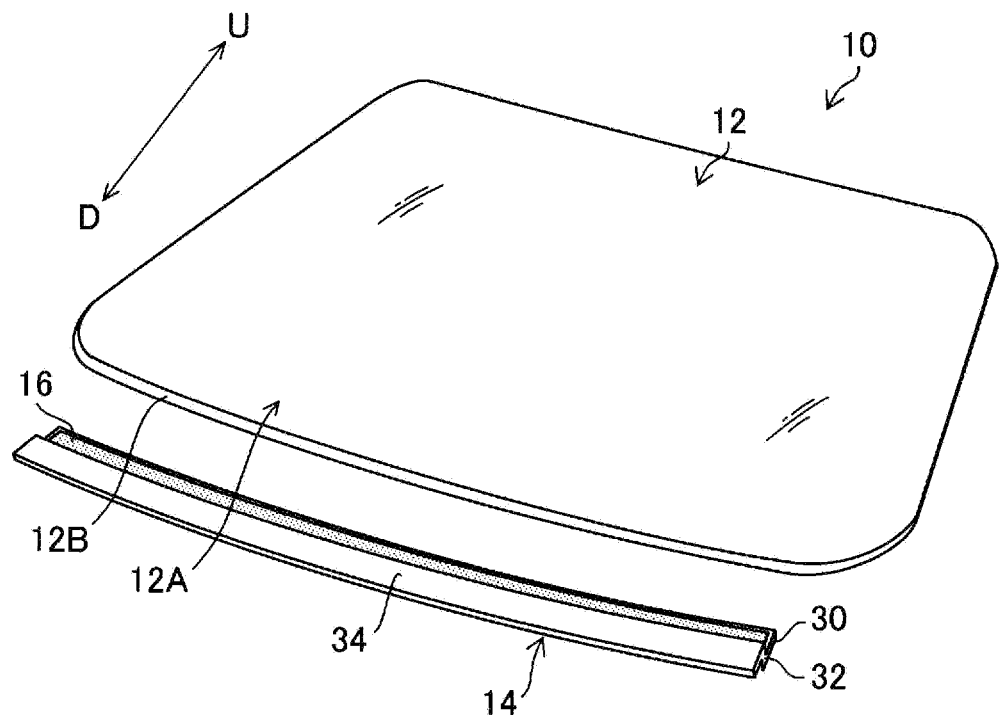
FIGS. 1(A) and 1(B) are schematic perspective views illustrating the windshield according to a first embodiment of the present invention.

Now, explanation will be made about preferred embodiments of a windshield with a molding and the connecting structure for a cowl louver and a windshield with a molding, to which the present invention is applied. In the drawings, identical or similar members or parts are denoted by like reference numerals, and redundant explanation may be omitted about such identical or similar members or parts.

Figure 1B:
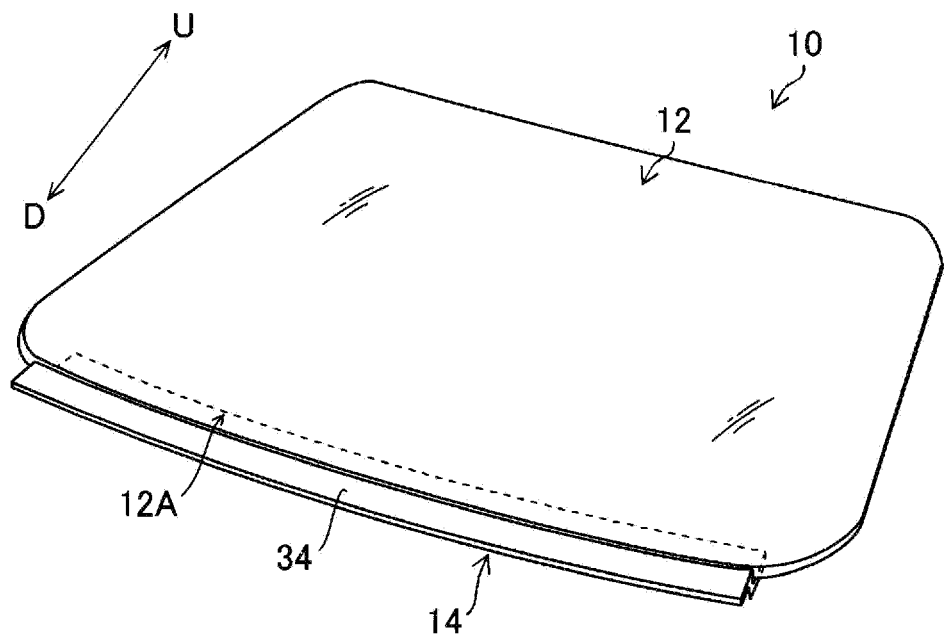

FIG. 1(A) is a schematic perspective view illustrating a windshield 12 and a molding 14 prior to assembly of the molding 14 to the windshield 12. FIG. 1(B) is a schematic perspective view illustrating a windshield with a molding 10 in a state where the molding 14 is assembled to the windshield 12.

Figure 2A:
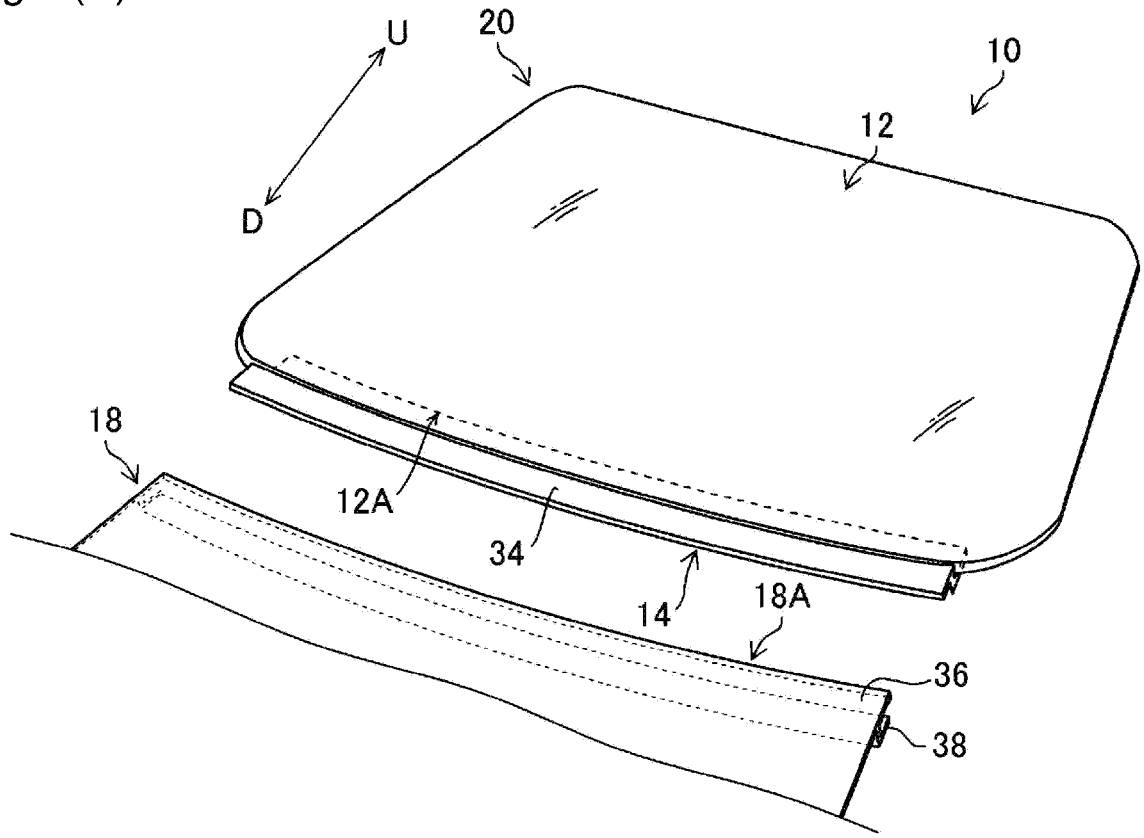
FIGS. 2(A) and 2(B) are schematic perspective views illustrating the connecting structure for a cowl louver and a windshield with a molding according to the first embodiment.
Figure 2B:
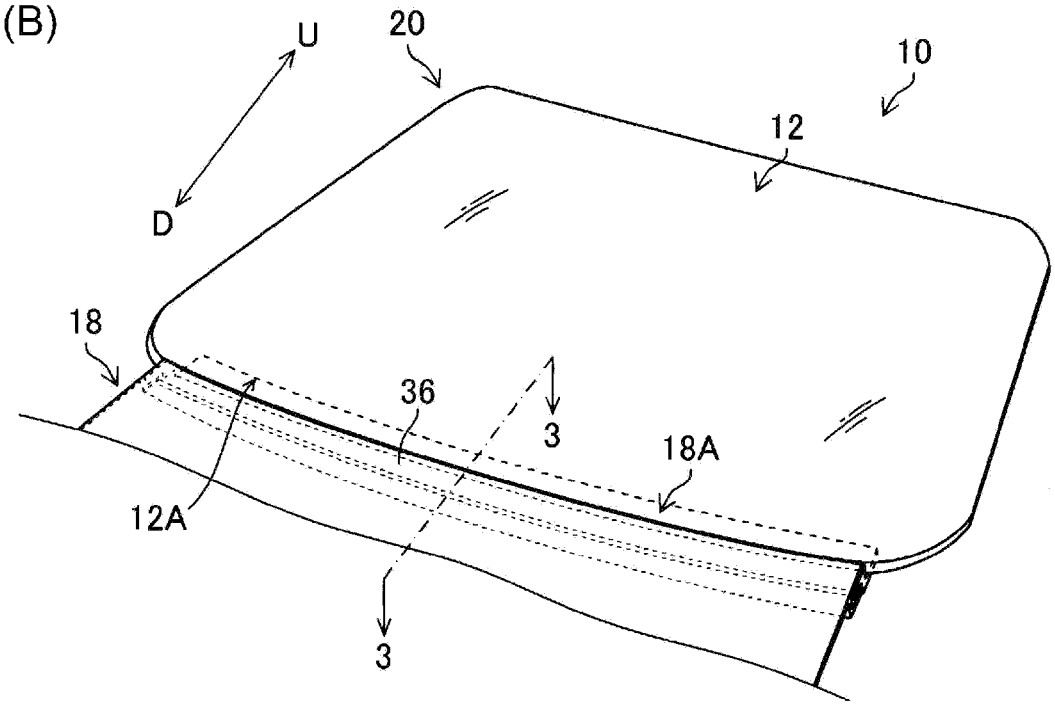

FIG. 2(A) is a schematic perspective view illustrating the windshield with a molding 10 and a cowl louver 18 prior to connection of the cowl louver 18 to the windshield with a molding 10. FIG. 2(B) is a schematic perspective view illustrating a connecting structure for a windshield with a molding and a cowl louver 20 in a state where the cowl louver 18 is connected to the windshield with a molding 10.

Figure 3:
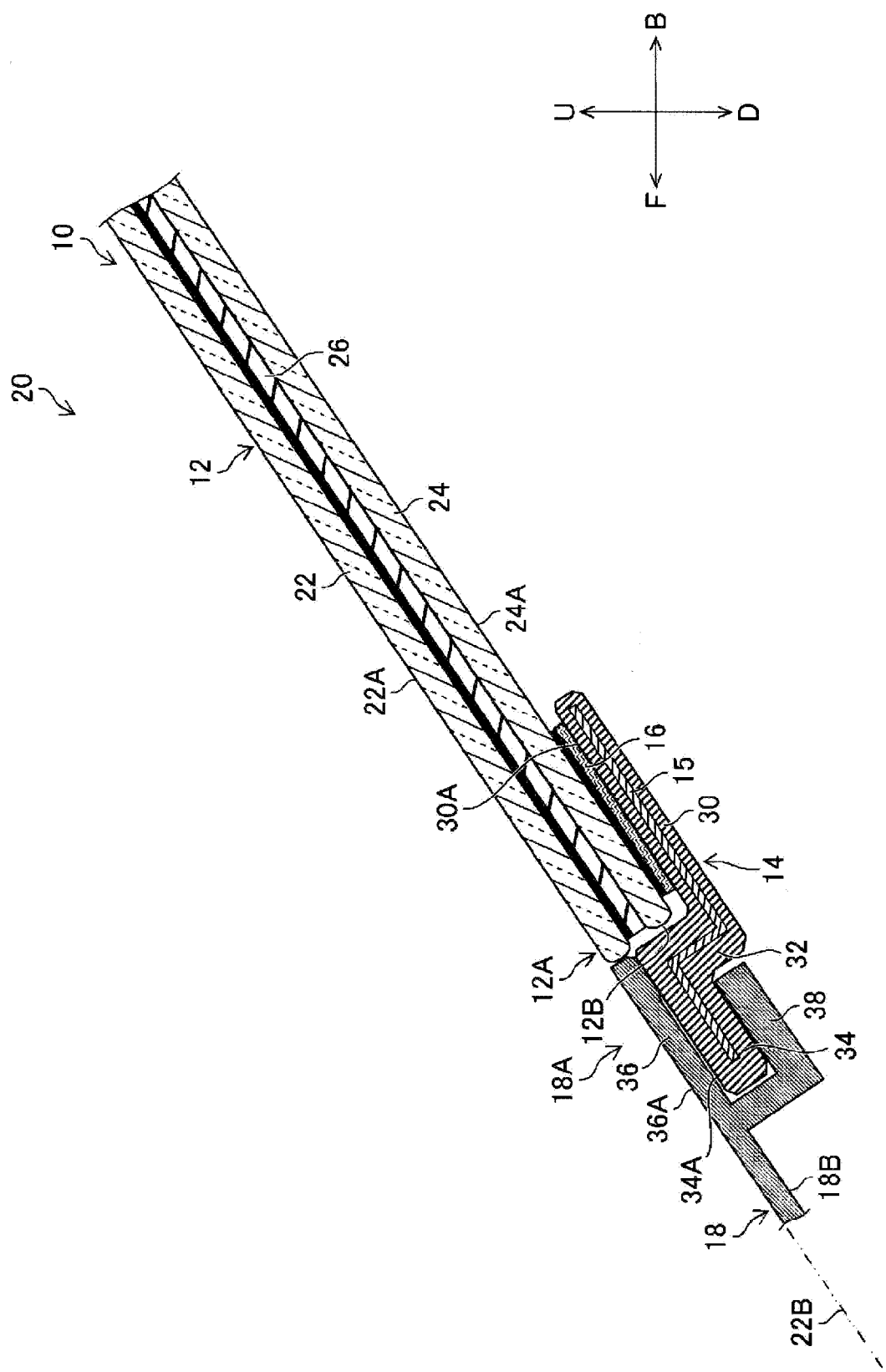
FIG. 3 is a longitudinal sectional view illustrating essential parts of the connecting structure for a cowl louver and a windshield with a molding shown in FIGS. 2A and 2B.

FIG. 3 is a longitudinal sectional view illustrating the connecting structure for a cowl louver and a windshield with a molding 20, taken along line 3-3 shown in FIG. 2(B).

In FIG. 1(A) to FIG. 11, arrow U (upward) indicates an upward direction of a vehicle body (shown only in FIG. 7), arrow D (down) indicates a downward direction of the vehicle body, arrow F (forward) indicates a forward direction of the vehicle body, and arrow B (backward) indicates a backward direction of the vehicle body. With regard to the surfaces of the windshield 12, a surface called "outer side surface" indicates a surface of the vehicle body facing an outer side, and a surface called "inner side surface" indicates a surface of the vehicle body facing an inner side. With regard to the surfaces of the molding 14 and the cowl louver 18, a surface called "upper surface" indicates a surface of them facing an upward direction, and a surface called "lower surface" indicates a surface of them facing a downward direction.

As shown in FIG. 1(A) to FIG. 3, the windshield with a molding 10 includes the windshield 12 and the molding 14. The molding 14 is assembled to an inner side surface of a lower edge portion 12A of the windshield 12 via a double sided tape 16. In this way, the windshield with a molding 10 is configured as shown in FIG. 1(B). The molding 14 and the windshield 12 may be bonded together by a known adhesive, such as an acrylic resin-based adhesive, a urethane resin-based adhesive or an epoxy resin-based adhesive.

The connecting structure for a cowl louver and a windshield with a molding 20 includes the windshield with a molding 10 and the cowl louver 18. The cowl louver 18 is connected to the molding 14 of the windshield with a molding 10. In this way, the connecting structure for a cowl louver and a windshield with a molding 20 is configured as shown in FIG. 2(B).

The windshield 12 is a windscreen, which is to be mounted to a front-side window frame of the vehicle body (not shown) and is made of laminated glass. Specifically, the windshield 12 is configured by bonding two glass plates (first glass plate and second glass plate) 22 and 24 via an Interlayer 26 made of PVB, EVA or the like as shown in FIG. 3.

As shown in FIG. 2(A) to FIG. 3, the molding 14 serves as a connecting member for connecting a rear end portion 18A of the cowl louver 18 to the lower edge portion 12A of the windshield 12. The molding 14 is made of a resin and has a longitudinal axis extending along the lower edge portion 12A of the windshield 12. The molding 14 may be produced by extrusion molding so long as the molding has a constant shape along the longitudinal axis direction of the molding 14. The production method is not limited to extrusion molding. The molding may be produced by injection molding. The molding 14 may be, for example, made of a lightweight and weather-resistant thermoplastic elastomer (TPE). The molding 14 is rigid and the molding 14 has a hardness of preferably at least 90° and at most 100° for example in terms of (Durometer Type A hardness according to JIS K6253 (hereinbelow, referred to as "hardness")).

When the molding 14 has a hardness of at most 90°, the molding 14 per se can have a sufficient rigidity.

As shown in FIG. 3, the molding 14 includes a first molding portion 30, a second molding portion 32 and a third molding portion 34 and is formed in a crank shape in longitudinal section. The molding 14 may be formed in a shape other than a crank shape in longitudinal section. The molding 14 has a metal core 15 embedded therein. The metal core 15 is formed in a plate shape and is formed in a crank shape in longitudinal section in conformity with the molding 14. The metal core 15 is helpful not only to reinforce the molding 14 but also to keep the shape of the molding 14.

The first molding portion 30 has an upper surface 30A bonded to an inner side surface 24A of the glass plate 24 by the double sided tape 16 at the lower edge portion 12A of the windshield 12. Although the first molding portion 30 is shown to be formed in a rectangular shape in longitudinal section, the first molding portion 30 may be formed in a shape other than a rectangular shape. The upper surface 30A of the first molding portion 30 may be bonded to the inner side surface 24A of the glass plate 24 by a known adhesive, such as an acrylic resin-based adhesive, a urethane resin-based adhesive or an epoxy resin-based adhesive.

The second molding portion 32 is configured to extend upward from the first molding portion 30 along an end surface 12B of the lower edge portion 12A of the windshield. The end surface 12B means lower end surfaces of the glass plates 22, 24 and the interlayer 26. The second molding portion 32 is preferred to be apart from the end surface 12B by a gap (which means that the second molding portion 32 is not brought into contact with the end surface 12B). In a case where the second molding portion 32 is brought into contact with the end surface 12B, when there are variations in the external dimensions of the glass plates 22, 24, the assembling position of the molding 14 to the windshield varies. When the assembling position of the molding 14 to the windshield varies, the connection between the molding 14 and the cowl louver 18 could not be made at a desired position. To the contrary, in a case where there is a gap between the second molding portion 32 and the end surface 12B, even when there are variations in the external dimensions of the glass plates 22, 24, the presence of the gap between the second molding portion 32 and the end surface 12B can absorb variations in the external dimensions of the glass plates 22, 24. When the gap between the second molding portion 32 and the end surface 12B is at least 1.0 mm and at most 3.0 mm, it is possible to absorb variations in the external dimensions of the glass plates 22, 24.

The third molding portion 34 has an upper surface 34A configured to extend from the second molding portion 32 in substantially parallel with an imaginary extension 22B of an outer side surface 22A of the glass plate 22, in other words, extend toward a front direction of the vehicle body, the imaginary extension being indicated by a double-dashed line. The third molding portion 34 is formed in a rectangular shape in longitudinal section so as to be engageable with the rear end portion 18A of the cowl louver 18, which is formed in a U-shape in section. Further, the upper surface 34A of the third molding portion 34 is disposed at a lower position than the imaginary extension 22B of the outer side surface 22A of the glass plate 22.

The cowl louver 18 shown in FIG. 1(A) to FIG. 3 is a plate-shaped member, which may be an injection-molded product made of polypropylene for example. As shown in FIG. 3, the rear end portion 18A of the cowl louver 18 includes a clamping edge portion 36 and a clamping member 38 and is formed in a U-shape in longitudinal section. The third molding portion 34 is mounted to the gap between the clamping edge portion 36 and the clamping members 38 to connect the rear end portion 18A of the cowl louver 18 to the third molding portion 34. When the rear end portion 18A of the cowl louver 18 is connected to the third molding portion 34, the clamping edge portion 36 has an upper surface 36A disposed so as to be substantially flush with the outer side surface 22A of the glass plate 22.

Now, explanation will be made about advantages of the windshield with a molding 10 and the connecting structure for the cowl louver 18 and the windshield with a molding 10 configured according to the first embodiment as described above.

[With Regard to Abnormal Noise and Glass Breakage]

In the connecting structure according to the first embodiment, the rear end portion 18A of the cowl louver 18 is connected to the lower edge portion 12A of the windshield 12 via the molding 14. In other words, the rear end portion 18A of the cowl louver 18 is connected to the third molding portion 34 having a soft property without being directly connected to the lower edge portion 12A of the windshield 12.

By this arrangement, even when a foreign matter enters in between the third molding portion 34 and the rear end portion 18A of the cowl louver 18, the third molding portion 34 serves as a buffering material, being elastically deformed so as to envelope the foreign matter. Thus, the connecting structure according to the first embodiment can reduce the generation of abnormal noise caused by the entry of a foreign matter during vehicle running to solve the problem of abnormal noise involved in the connecting structure disclosed by Patent Document 1. Further, even when a foreign matter enters, the foreign matter is prevented from interposing between the rear end portion 18A of the cowl louver 18 and laminated glass. Thus, a glass surface can be prevented from being scratched by a foreign matter to solve the problem of glass breakage.

[With Regard to Workability in Connection]

The connecting work for connecting the cowl louver 18 to the windshield with a molding 10 is carried out such that the rear end portion 18A of the cowl louver 18 is brought closer to the third molding portion 34 of the molding 14 as shown in FIG. 2(A), followed by pushing the cowl louver 18 in an upper direction (U direction) so as to clamp the third molding portion 34 between the clamping edge portion 36 and the clamping members 38 of the cowl louver 18. Thus, the third molding portion 34 is fitted into the gap between the clamping edge portion 36 and the clamping member 38, with the result that the cowl louver 18 is connected to the windshield with a molding 10 as shown in FIG. 3.

In other words, the connecting structure according to the first embodiment can connect the cowl louver 18 to the windshield with a molding 10 by merely pushing the cowl louver 18 in the upward direction with respect to the windshield with a molding 10. Thus, it is possible to solve the problem of workability in connection involved in the connecting structure disclosed by Patent Document 2.

[Problem of Stop Position of Wiper]

In the connecting structure 20 for a cowl louver and a windshield with a molding, the upper surface 36A of the clamping edge portion 36 as the upper surface of the cowl louver 18 is flush with the outer side surface 22A of the glass plate 22 of the windshield 12. This arrangement allows the stop position of a wiper to be set closer to the lower end edge portion of the windshield 12 than before. Thus, the connecting structure 20 according to the first embodiment can solve the problem of the stop position of a wiper involved in the connecting structure disclosed by Patent Document 1.
[Problem of Production Accuracy for Each of Molding and Cowl Louver]

The third molding portion 34, into which the rear end portion 18A of the cowl louver 18 is fitted, is formed in a rectangular shape in longitudinal section, and the rear end portion 18A of the cowl louver 18 is formed in a U-shape in longitudinal section. In other words, the third molding portion 34 and the rear end portion 18A are formed in a simpler shape than those of the connecting structure disclosed in Patent Document 2.

In the connecting structure disclosed in Patent Document 2, it is difficult to produce the rib of the cowl louver and the snap-in recess of the molding with good accuracy since the rib and snap-in recess are formed in an extremely complicated shape. This makes it difficult in many cases to connect the cowl louver to the molding with good accuracy with respect to the connecting structure disclosed by Patent Document 2, being affected by the production accuracy of the rib and the snap-in recess.

In contrast, in the connecting structure according to the first embodiment, fine adjustment can be easily made to the connection position of the cowl louver 18 to the molding 14 since the connection can be carried out by merely fitting the third molding portion 34 in a rectangular shape in longitudinal section into the rear end portion 18A in a U-shape in longitudinal section. By this arrangement, it is possible to connect the cowl louver 18 to the molding 14 with good accuracy without being affected by the production accuracy for each of the third molding portion 34 and the rear end portion 18A. Thus, the connecting structure 20 for a cowl louver and a windshield with a molding according to the first embodiment, it is possible to solve the problem of the production accuracy for each of the molding and the cowl louver, which is involved in the connecting structure according to Patent Document 2.

As described above, In accordance with the windshield with a molding 10 of the first embodiment, it is possible to simultaneously solve the problems of abnormal noise and glass breakage caused by a foreign matter, and the problem of workability in connection of a cowl louver 18 to the windshield 12.

Further, in accordance with the connecting structure of the first embodiment, it is possible to simultaneously solve the problem of the stop position of a wiper and the problem of production accuracy for each of the molding 14 and the cowl louver 18, in addition to the just above-mentioned problems.

Figure 4:
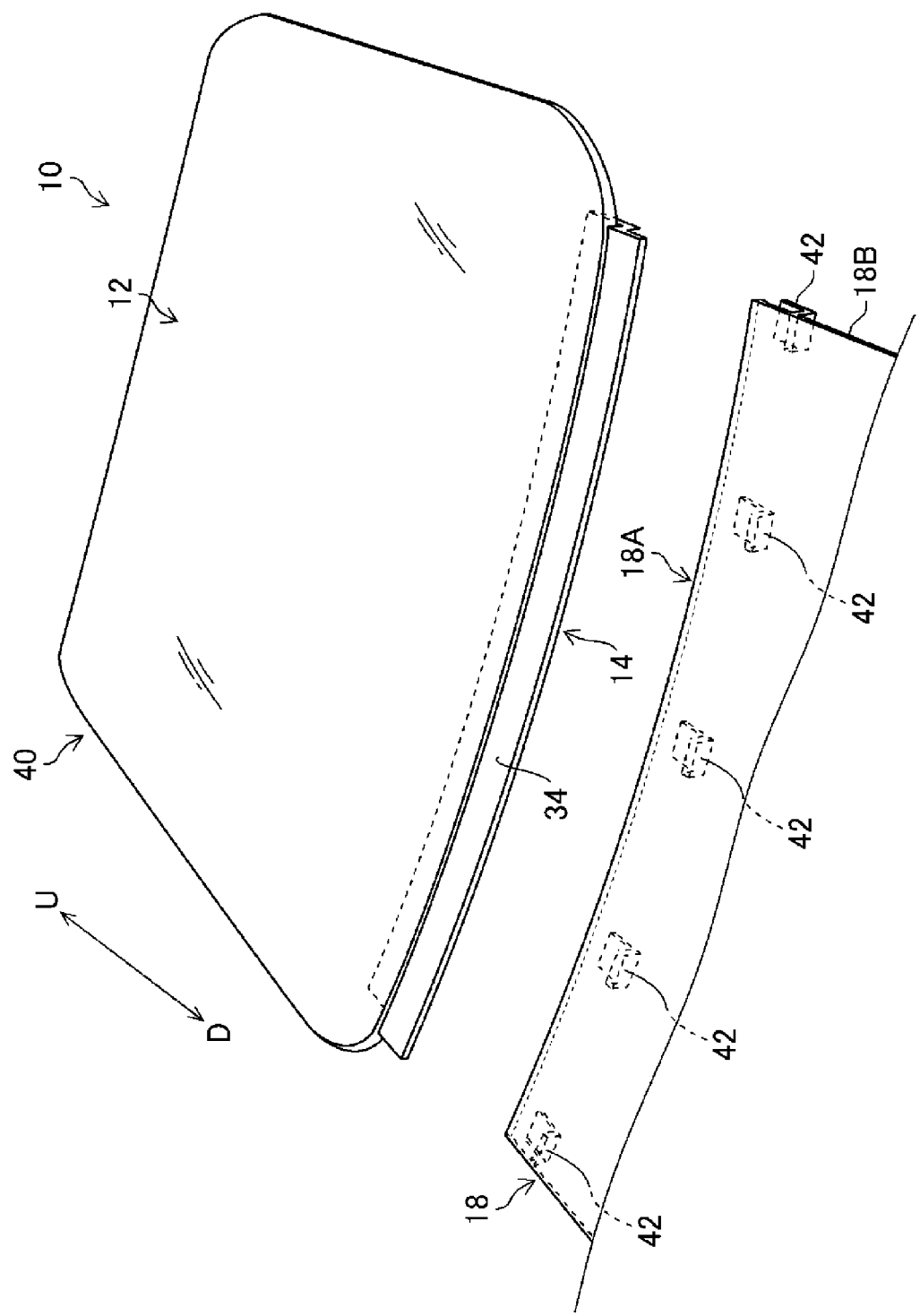
FIG. 4 is a schematic perspective view illustrating the connecting structure for a cowl louver and a windshield with a molding according to a second first embodiment of the present invention.

With regard to explanation about the connecting structure for a cowl louver and a windshield with a molding 40 according to a second embodiment shown in FIG. 4, members or parts identical or similar to those shown in FIG. 2(A) to FIG. 3 are denoted by like reference numerals, and explanation about such identical or similar members or parts will be omitted.

The connecting structure 40 shown in FIG. 4 is different from the connecting structure 20 shown in FIG. 2(A) to FIG. 3 in terms of the structure of a rear end portion 18A of a cowl louver 18 and is the same as the latter in terms of the remaining members and parts.

The rear end portion 18A of the cowl louver 18 shown in FIG. 4 includes a clamping edge portion 36 and a plurality of clamping members 42 formed in an L-shape on a lower surface 18B of the cowl louver 18. The clamping members 42 are disposed at regular intervals along the rear end portion 18A of the cowl louver 18. Thus, the rear end portion 18A with the respective clamping members 42 is configured in a U-shape in longitudinal section by the respective clamping members 42 and the clamping edge portion 36.

Even in a case of the cowl louver 18 with such clamping members 42, as in the cowl louver 18 shown in FIG. 2(A) to FIG. 3, it is possible to connect the cowl louver 18 to a windshield with a molding 10 by merely pushing upward the cowl louver 18 with respect to the windshield with a molding 10. Thus, in accordance with the connecting structure proposed as the connecting structure 40 for a cowl louver and a windshield with a molding of the second embodiment, it is possible to solve the problem in workability in connection involved in the connection structure disclosed by Patent Document 2.

Figure 5:
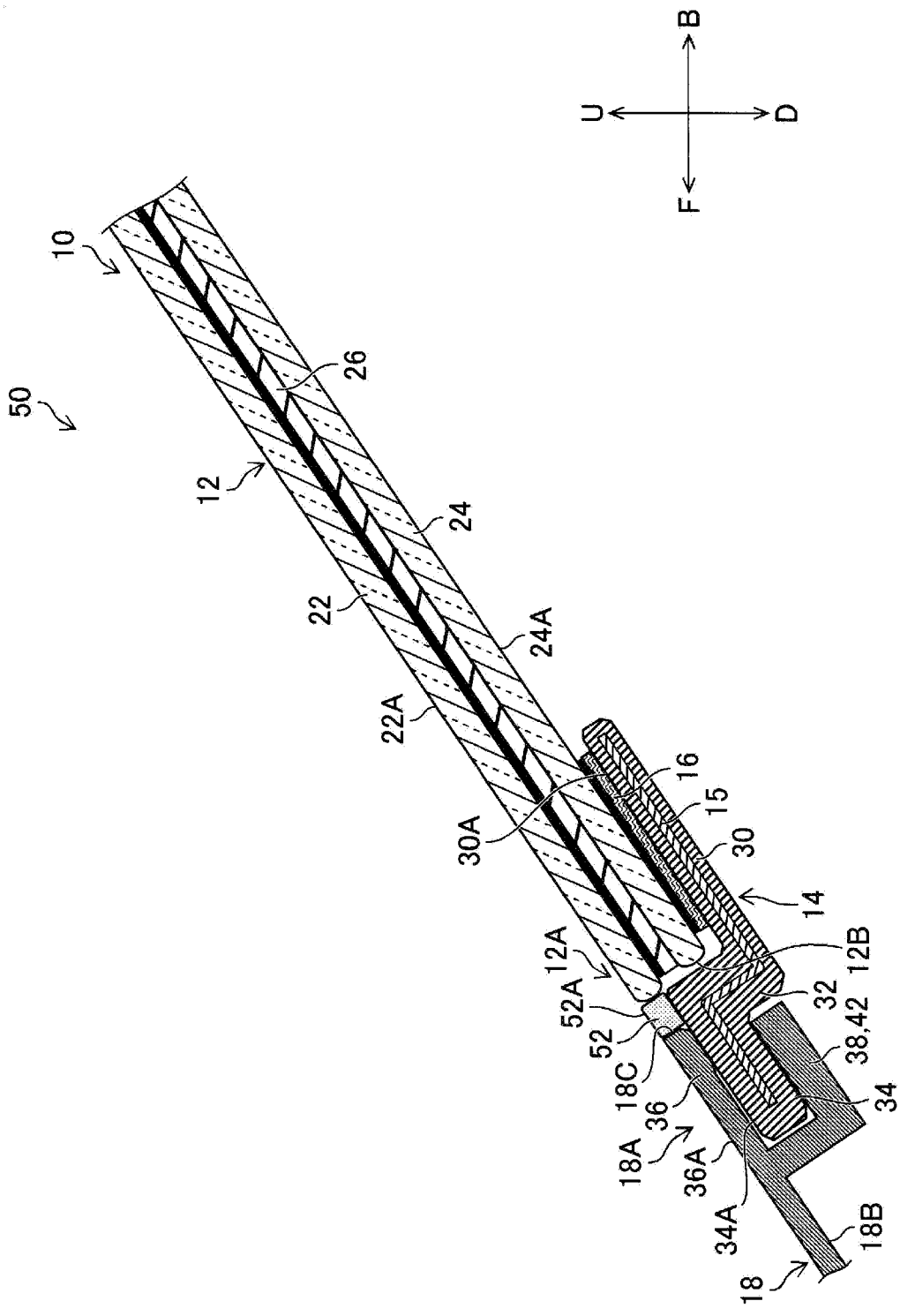
FIG. 5 is a longitudinal sectional view illustrating essential parts of the connecting structure for a cowl louver and a windshield with a molding according to a third embodiment of the present invention.

With regard to explanation about the connecting structure for a cowl louver and a windshield with a molding 50 according to a third embodiment shown in FIG. 5, members or parts identical or similar to those shown in FIG. 2(A) to FIG. 4 are denoted by like reference numerals, and explanation about such identical or similar members or parts will be omitted.

The connecting structure 50 shown in FIG. 5 is different from the connecting structures 20, 40 shown in FIG. 2(A) to FIG. 4 in terms of the structure of a third molding portion 34 of a molding 14 and is the same as the latter in terms of the remaining members or parts.

The third molding portion 34 of the connecting structure 50 includes a first spacer 52. The first spacer 52 is a convex spacer, which is disposed on an upper surface 34A of the third molding portion 34 along an end surface 12B of a lower edge portion 12A of a windshield 12 and protrudes toward the outer side. The first spacer 52 is interposed between an end surface 18C of a rear end portion 18A of a cowl louver 18 and the end surface 12B of the lower edge portion 12A of the windshield 12. The first spacer 52 is made of a softer material than a molding 14 and has an upper surface 52A formed so as to be flush with an outer side surface 22A of a glass plate 22. The first spacer 52 may be produced integrally with the third molding portion 34 by two-color molding and may be produced by another known method. Furthermore, the first spacer 52 may be bonded to the upper surface 34A of the third molding portion 34 by an adhesive or the like. The first spacer 52 may be, for example, made of a soft material of TPE having a hardness of at least 60° and at most 70°.

The first spacer 52 having a soft property can be disposed on the third molding portion 34 to seal the gap between the end surface 12B of the windshield 12 and the end surface 18C of the cowl louver 18 by the first spacer 52. Thus, an interlayer 26 can be protected from a liquid, such as rain since such a liquid is prevented from adhering to the end surface 12B of the windshield 12.

Figure 6:
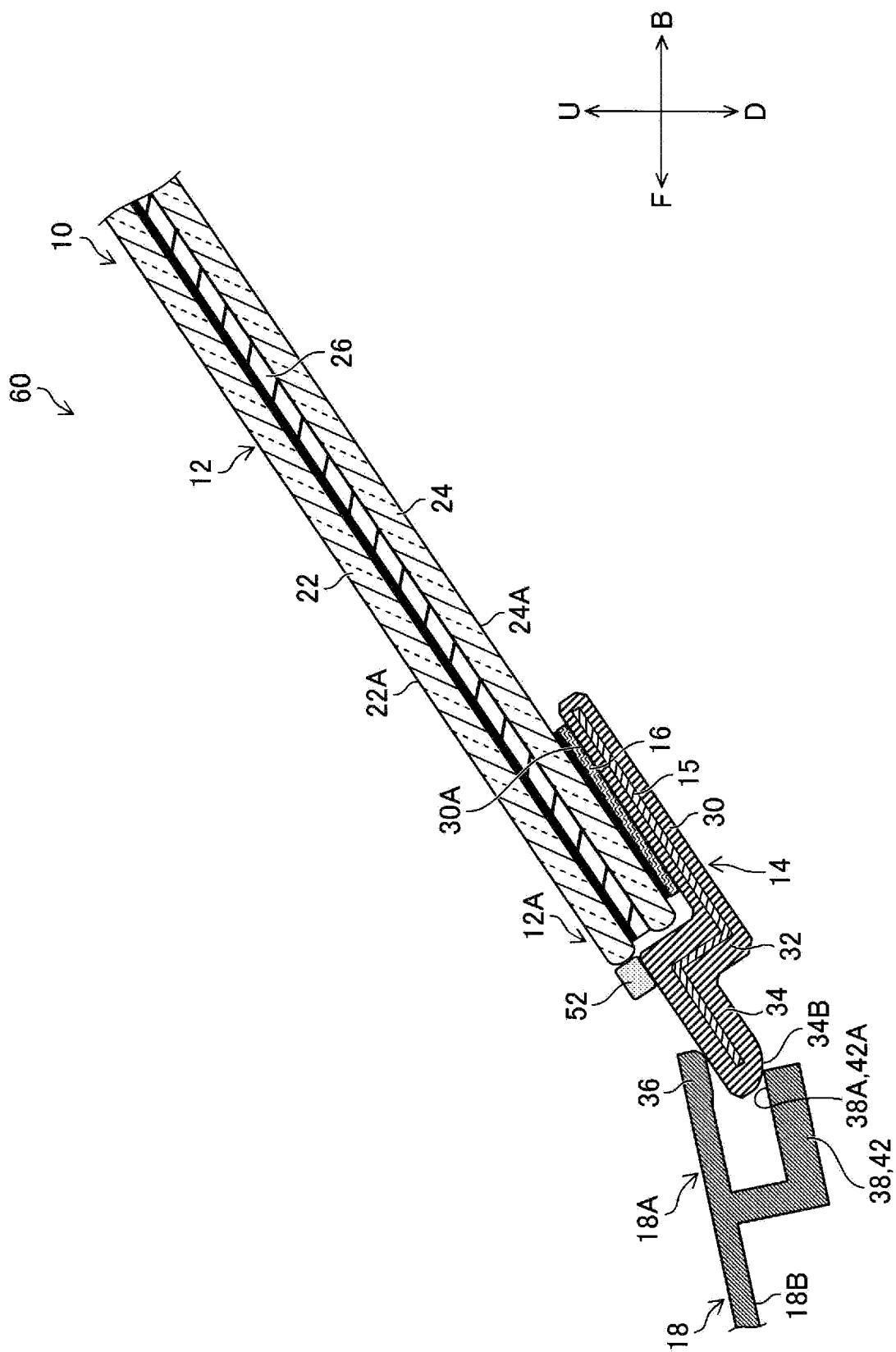
FIG. 6 is a longitudinal sectional view illustrating essential parts of the connecting structure for a cowl louver and a windshield with a molding according to a fourth embodiment of the present invention.

FIG. 6 illustrates a fourth embodiment, which is shown in a state just before connection of cowl louver 18 to a molding 14. With regard to explanation about the connecting structure for a cowl louver and a windshield with a molding 60 shown in FIG. 6, members or parts identical or similar to those of the connecting structure 50 shown in FIG. 5 are denoted by like reference numerals, and explanation about such identical or similar members or parts will be omitted.

The connecting structure 50 shown in FIG. 6 is different from the connecting structure 50 shown in FIG. 5 in terms of the shape of a lower end surface of a third molding portion 34 and is the same as the latter in terms of the remaining members or parts. Specifically, the third molding portion 34 has a lower end surface 34B on an inner side surface formed in a curved shape in longitudinal section of FIG. 6.

When the cowl louver 18 is connected to the third molding portion 34, upper surfaces 38A, 42A of clamping members 38, 42 are brought into contact with the end surface 34B of the third molding portion 34. When the cowl louver 18 is pushed upward in that state, the cowl louver 18 is smoothly pushed upward, being guided by the end surface 34B formed in a curved shape. Thus, in accordance with the connecting structure proposed as the connecting structure for a cowl louver and a windshield with a molding 60 of the fourth embodiment, it is possible to smoothly connect the cowl louver 18 to the molding 14. Although it is shown in FIG. 6 that the lower end surface 34B of the inner side surface of the third molding portion 34 is formed in a curved shape, the present invention is not limited to such a mode. The entire lower end surface of the third molding portion 34 may be formed in a curved shape.

Figure 7:
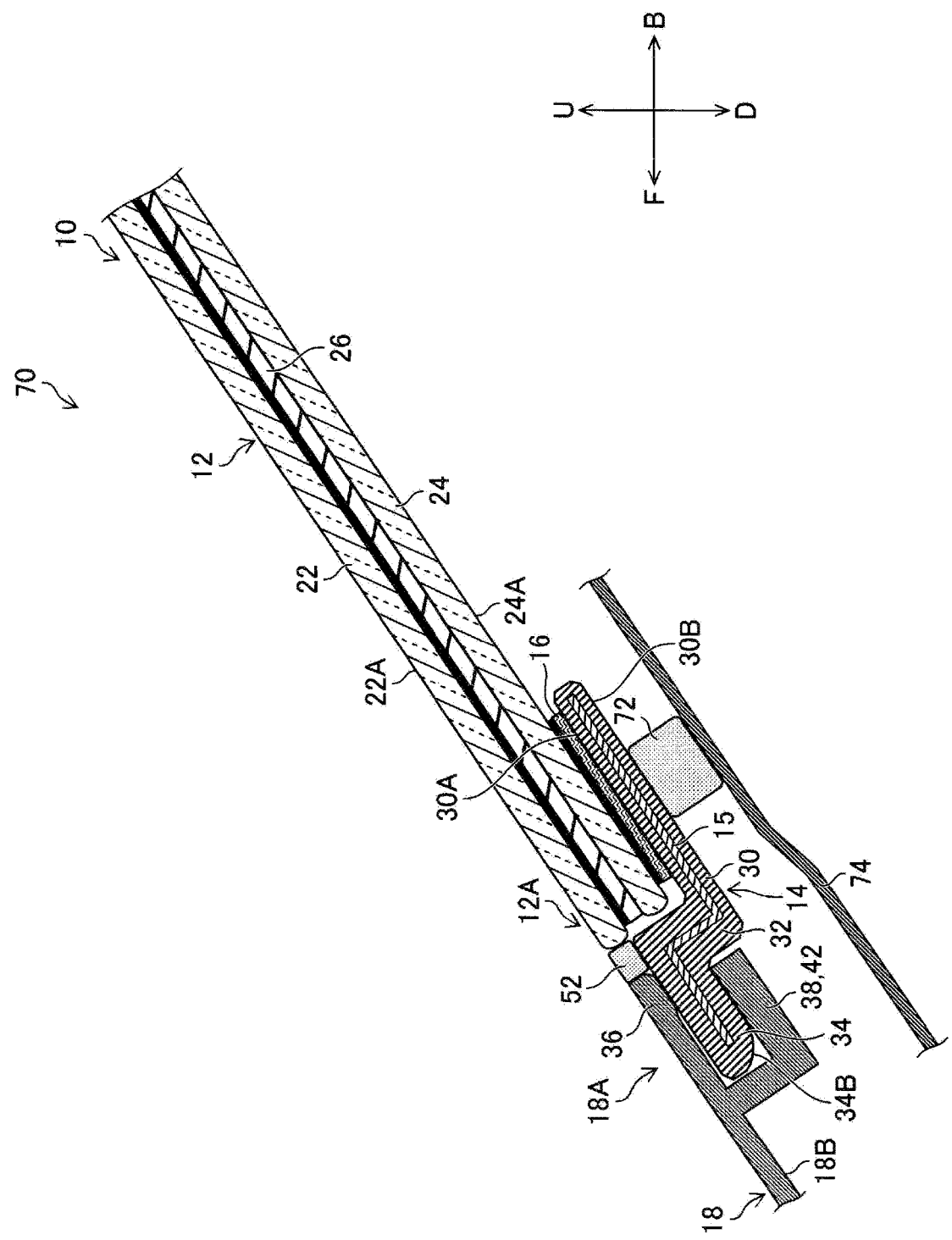
FIG. 7 is a longitudinal sectional view illustrating essential parts of the connecting structure for a cowl louver and a windshield with a molding according to a fifth embodiment of the present invention.

With regard to explanation about the connecting structure for a cowl louver and a windshield with a molding 70 according to a fifth embodiment shown in FIG. 7, members or parts identical or similar to those of the connecting structure 60 shown in FIG. 6 are denoted by like reference numerals, and explanation about such identical or similar members or parts will be omitted.

The connecting structure 70 shown in FIG. 7 is different from the connecting structure 60 shown in FIG. 6 in terms of the structure of a first molding portion 30 of a molding 14 and is the same as the latter in terms of the remaining members or parts.

The first molding portion 30 of the connecting structure for a cowl louver and a windshield with a molding 70 includes a second spacer 72. The second spacer 72 is disposed on a lower surface 30B of the first molding portion 30, being directed downward. The second spacer is brought into contact with a vehicle body 74, serving for holding the gap between the vehicle body 74 and the connecting structure for a cowl louver and a windshield with a molding 70.

The second spacer 72 is made of a softer material than the molding 14. The second spacer may be produced integrally with the first molding portion 30 by two-color molding or by another known method. The second spacer 72 may be bonded to the lower surface 30B of the first molding portion 30 by an adhesive or the like. The second spacer 72 may be, for example, made of a soft material of TPE having a hardness of at least 60° and at most 70°. By this arrangement, the connecting structure 70 according to the fourth embodiment is supported by the vehicle body 74 via the second spacer 72 having a proper flexibility, with the result that vibrations from the vehicle body 74 to the connecting structure for a cowl louver and a windshield with a molding 70 can be properly absorbed by the second spacer 72.

Figure 8:
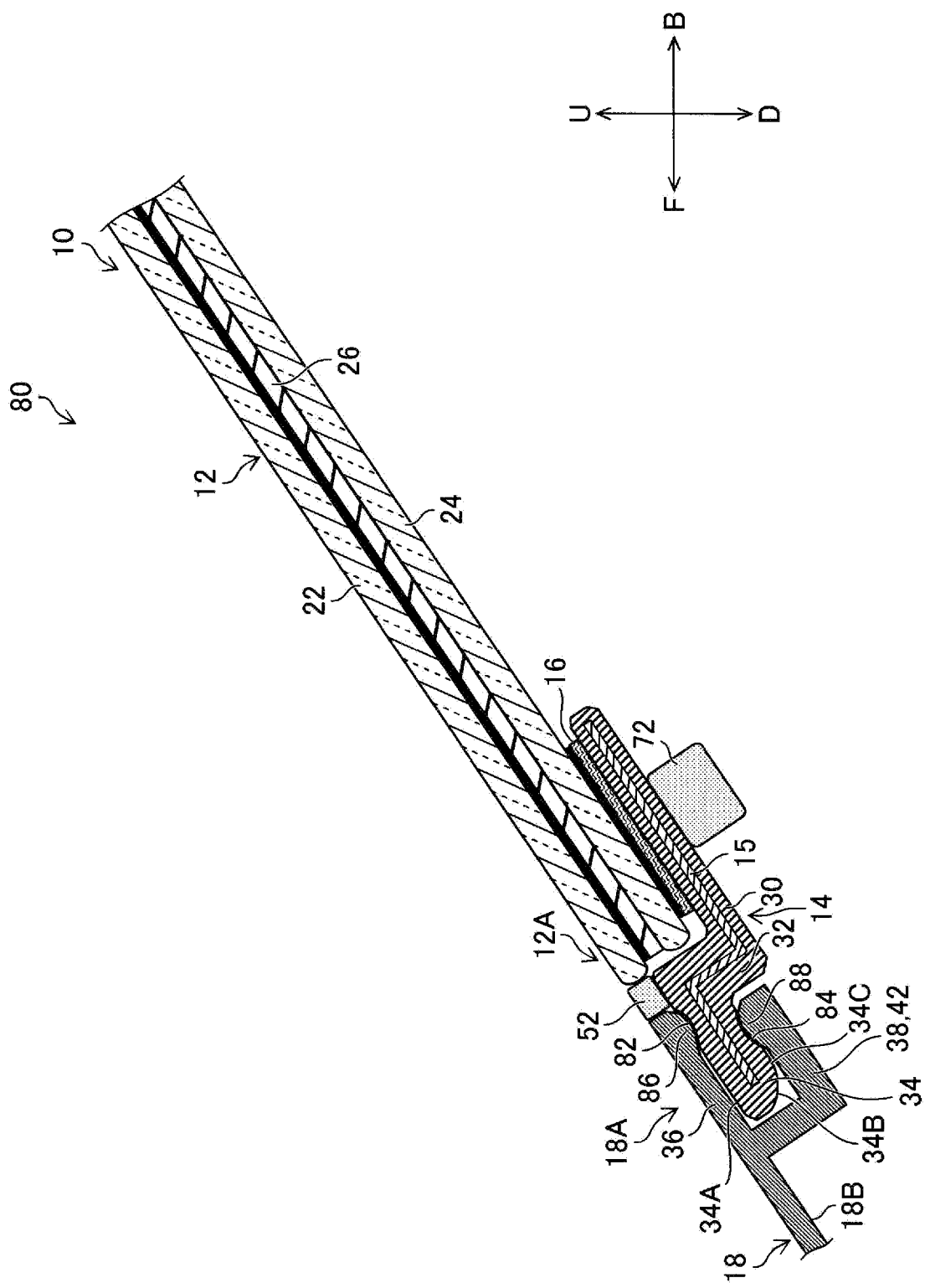
FIG. 8 is a longitudinal sectional view illustrating essential parts of the connecting structure for a cowl louver and a windshield with a molding according to a sixth embodiment of the present invention.

With regard to explanation about the connecting structure for a cowl louver and a windshield with a molding 80 according to a sixth embodiment shown in FIG. 8, members or parts identical or similar to those of the connecting structure 70 shown in FIG. 7 are denoted by like reference numerals, and explanation about such identical or similar members or parts will be omitted.

The connecting structure 80 shown in FIG. 8 is different from the connecting structure 70 shown in FIG. 7 in terms of the structure of a third molding portion 34 of a molding 14 and the structure of a rear end portion 18A of a cowl louver 18 and is the same as the latter in terms of the remaining members or parts.

The third molding portion 34 of the connecting structure 80 has recessed portions 82, 84 formed as engaged portions on an upper surface 34A and a lower surface 34C. On the rear end portion 18A of the cowl louver 18, a convex portion 86 is formed on a clamping edge portion 36 so as to serve as an engageable portion to be engaged with the recessed portion 82 while a convex portion 88 is formed on each of clamping members 38, 426 so as to serve as an engageable portion to be engaged with the recessed portion 84. Thus, it is possible to increase the engaging force of the cowl louver 18 to the molding 14.

Although the two recessed portions 82, 84 are formed on the third molding portion 34 in the embodiment shown in FIG. 8, it is sufficient that either the recessed portion 82 or the recessed portion 84 is formed. Likewise, with respect to the convex portions 86, 88 formed on the rear end portion 18A, it is sufficient that either the convex portion 86 or the convex portion 88 are formed.

The connecting structure according to this embodiment is preferred to include a structure for keeping the positional relationship between the third molding portion 34 and the rear end portion 18A of the cowl louver 18 constant so as to avoid a right and left difference in the windshield 12 in terms of insertion of the rear end portion 18A of the cowl louver 18 into the third molding portion 34.

Figure 9:
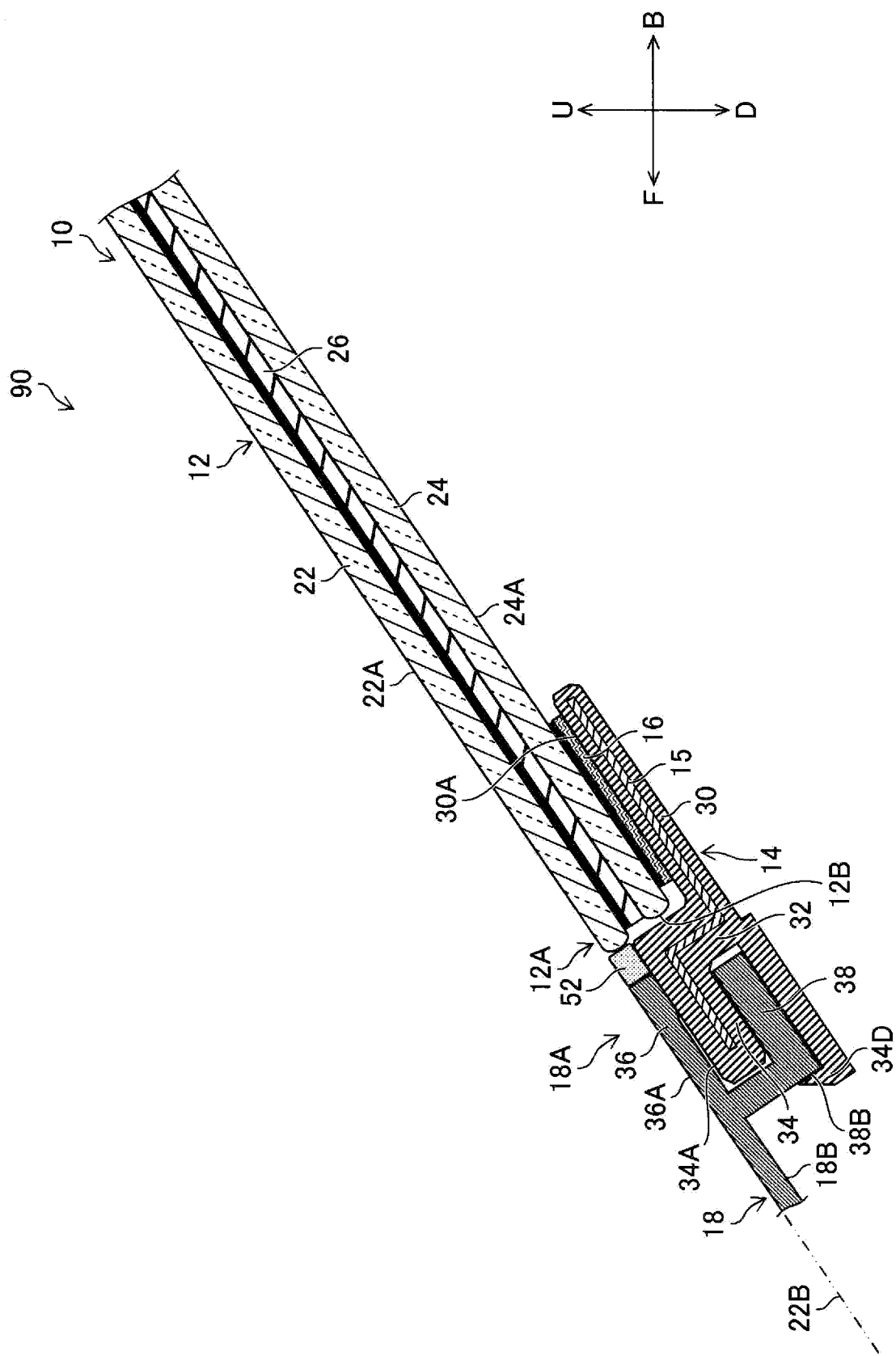
FIG. 9 is a longitudinal sectional view illustrating essential parts of the connecting structure for a cowl louver and a windshield with a molding according to a seventh embodiment of the present invention.

The connecting structure for a cowl louver and a windshield with a molding 90 according to a seventh embodiment shown in FIG. 9 is different from the connecting structure 50 shown in FIG. 5 in that a third molding portion 34 has a claw 34D extending so as to be engageable with front end surfaces 38B of clamping members 38 of a cowl louver 18. The claw 34D may be formed on the entire third molding portion 34 in a longitudinal direction or be intermittently formed thereon. The claw 34D can be engaged with the front end surfaces 38B of the clamping members 38 to keep the positional relationship between the third molding portion 34 and the rear end portion 18A of the cowl louver 18 more constant.

Figure 10:
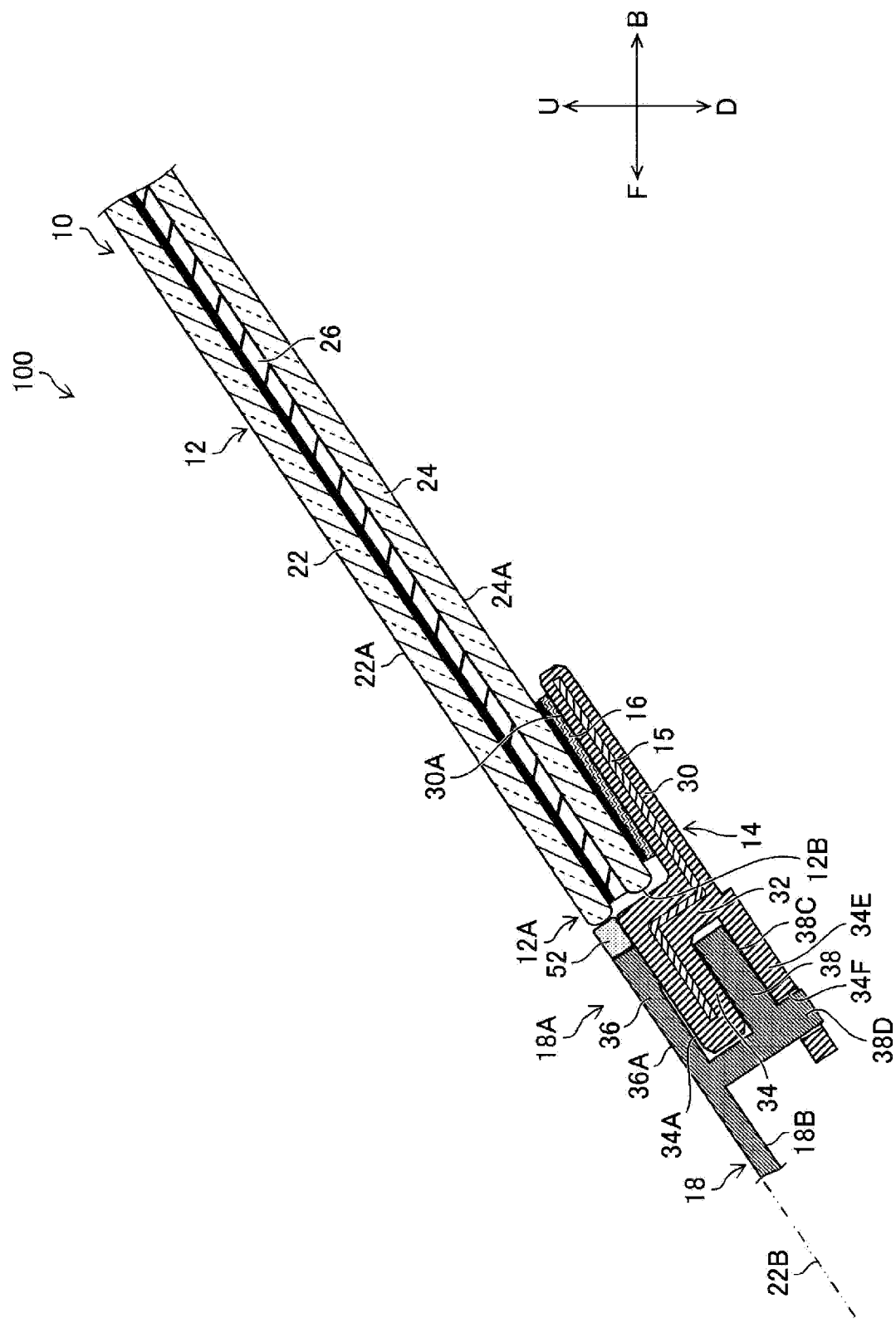
FIG. 10 is a longitudinal sectional view illustrating essential parts of the connecting structure for a cowl louver and a windshield with a molding according to an eighth embodiment of the present invention.

As in the connecting structure for a cowl louver and a windshield with a molding 100 according to an eight embodiment and shown in FIG. 10, the connecting structure for making the positional relationship constant may be configured such that a third molding portion 34 has an extended portion 34E formed so as to cover a lower surface 38C of each of clamping members 38, the extended portion 34E has through holes 34F formed therein, and the lower surface 38C of each of clamping members has a convex portion 38D formed thereon so as to be engageable with its corresponding through hole 34F. It is possible to make the positional relationship between the third molding portion 34 and the rear end portion 18A of the cowl louver more constant by engaging the convex portions 38D with the through holes 34F.

Figure 11:
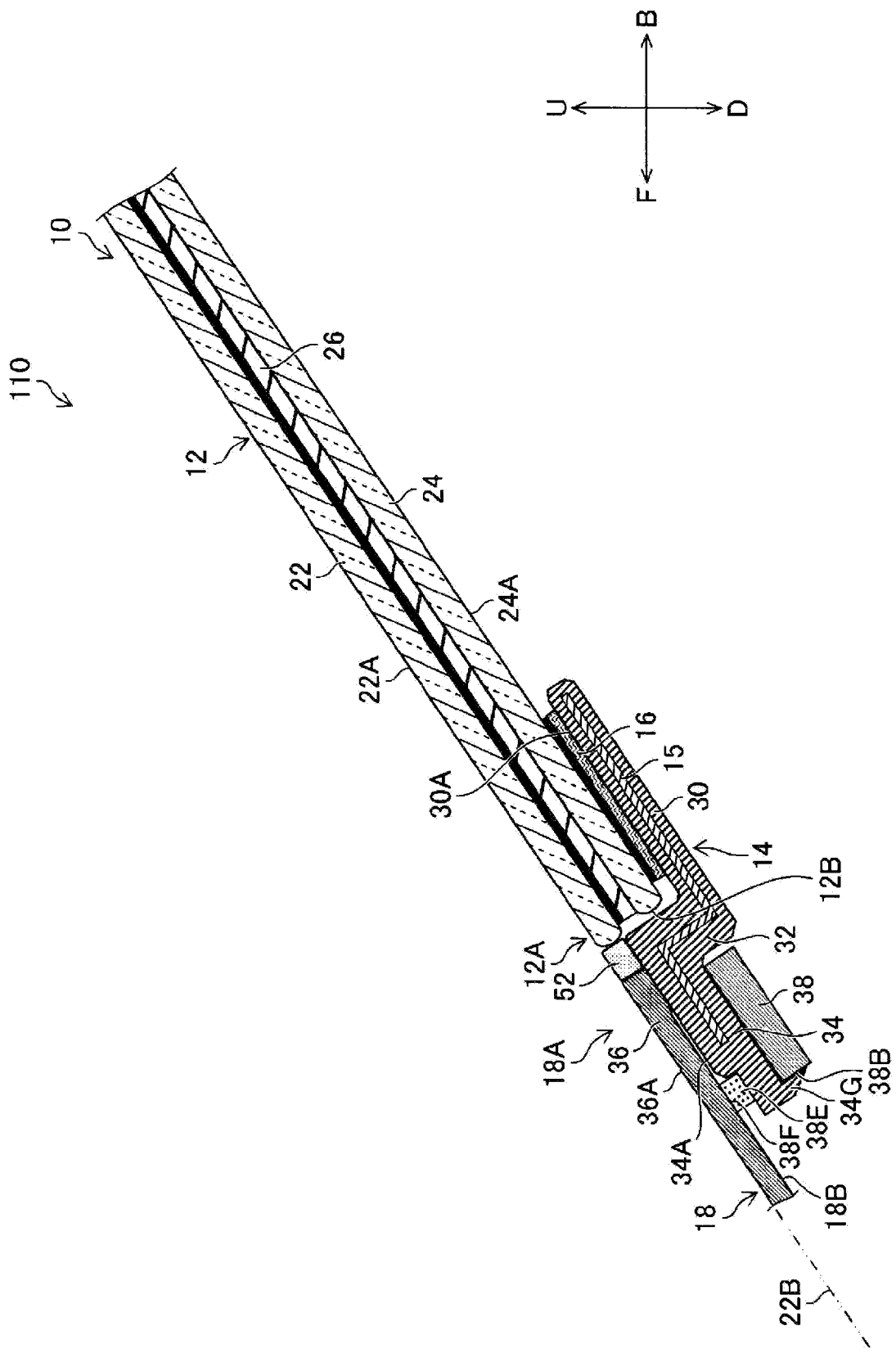
FIG. 11 is a longitudinal sectional view illustrating essential parts of the connecting structure for a cowl louver and a windshield with a molding according to a ninth embodiment of the present invention.

As in the connecting structure for a cowl louver and a windshield with a molding 110 according to a ninth embodiment and shown in FIG. 11, the connecting structure may be configured such that a third molding portion 34 has a claw 34G formed thereon, and each of clamping members 38 has a through hole 38F formed in a base portion 38E so as to receive its corresponding claw portion G. The claws 34G can pass through the through holes 38F to be engaged with front end surfaces 38B of the clamping members 38 to make the positional relationship between the third molding portion 34 and the rear end portion 18A of the cowl louver 18. The claw portions 34G are formed on at least both sides of the third molding portion 34 in a longitudinal direction, and likewise, the through holes 38F are formed on at least both sides of the cowl louver 18 in a longitudinal direction

REFERENCE SYMBOLS

10: windshield with a molding, 12: windshield, 12A: lower edge portion, 14: molding, 15: metal core, 16: double sided tape, 18: cowl louver, 18A: rear end portion, 20: connecting structure for a cowl louver and a windshield with a molding according to a first embodiment, 22: glass plate, 24: glass plate, 26: interlayer, 30: first molding portion, 32: second molding portion, 34: third molding portion, 34A: upper surface, 34B: lower edge portion, 34C: lower surface, 34D: claw, 34E: extended portion, 34F: through hole, 34G: claw, 36: clamping edge portion, 38: clamping member, 38A: upper surface, 38B: front end surface, 38C: lower surface, 38E: base portion, 38F: through hole, 40: connecting structure for a cowl louver and a windshield with a molding according to a second embodiment, 42: clamping member, 42A: upper surface, 50: connecting structure for a cowl louver and a windshield with a molding according to a third embodiment, 52: first spacer, 60: connecting structure for a cowl louver and a windshield with a molding according to a fourth embodiment, 70: connecting structure for a cowl louver and a windshield with a molding according to a fifth embodiment, 72: second spacer, 74: vehicle body, 80: connecting structure for a cowl louver and a windshield with a molding according to a sixth embodiment, 82: recessed portion, 84: recessed portion, 86: convex portion, 88: convex portion, 90: connecting structure for a cowl louver and a windshield with a molding according to a seventh embodiment, 100: connecting structure for a cowl louver and a windshield with a molding according to an eighth embodiment, 110: connecting structure for a cowl louver and a windshield with a molding according to a ninth embodiment.

What is claimed is:

1. A connecting structure for a cowl louver and a windshield with a molding, comprising:
   (a) a windshield with a molding, comprising:
      (i) laminated glass having a first glass plate to be disposed on an outer side of a vehicle body, a second glass plate to be disposed on an inner side of the vehicle body and an interlayer bonding the first glass plate and the second glass plate; and
      (ii) a molding disposed on a lower edge portion of the laminated glass;
      wherein the molding includes a first molding portion having an upper surface bonded to an inner side surface of the second glass plate, a second molding portion extending upward from the first molding and along an end surface of the lower edge portion of the laminated glass, and a third molding portion extending from the second molding portion in a forward direction of the vehicle body; and
      wherein the third molding portion has an upper surface disposed at a lower position than an imaginary extension of an outer side surface of the first glass plate; and
   (b) a cowl louver having a rear end portion engageable with the third molding portion of the molding of the windshield with a molding, the rear end portion being formed in a U-shape in longitudinal section;
   wherein the rear end portion of the cowl louver has an upper surface formed so as to be flush with an imaginary extension of the outer side surface of the first glass plate of the laminated glass.

2. The connecting structure for a cowl louver and a windshield with a molding according to claim 1, wherein the third molding portion has a lower inner side end surface formed in a curved shape in section.

3. A connecting structure for a cowl louver and a windshield with a molding, comprising:
   (a) a windshield with a molding, comprising:
      (i) laminated glass having a first glass plate to be disposed on an outer side of a vehicle body, a second glass plate to be disposed on an inner side of the vehicle body and an interlayer bonding the first glass plate and the second glass plate; and
      (ii) a molding disposed on a lower edge portion of the laminated glass;
      wherein the molding includes a first molding portion having an upper surface bonded to an inner side surface of the second glass plate, a second molding portion extending upward from the first molding and along an end surface of the lower edge portion of the laminated glass, and a third molding portion extending from the second molding portion in a forward direction of the vehicle body; and
      wherein the third molding portion has an upper surface disposed at a lower position than an imaginary extension of an outer side surface of the first glass plate; and
      wherein the third molding portion is disposed along the end surface of the lower edge portion of the laminated glass and includes a first spacer softer than the molding, and wherein the first spacer has an upper surface formed so as to be flush with the outer side surface of the first glass plate; and
   (b) a cowl louver having a rear end portion engageable with the third molding portion of the molding of the windshield with a molding, the rear end portion being formed in a U-shape in longitudinal section;
   wherein the rear end portion of the cowl louver has an upper surface formed so as to be flush with an imaginary extension of the outer side surface of the first glass plate of the laminated glass; and
   wherein the first spacer is interposed between the rear end portion of the cowl louver and the laminated glass.

4. The connecting structure for a cowl louver and a windshield with a molding according to claim 3, wherein the first molding portion has a second spacer disposed on a lower surface thereof so as to be brought into contact with the vehicle body, the second spacer being softer than the molding.

5. A connecting structure for a cowl louver and a windshield with a molding, comprising:
   (a) a windshield with a molding comprising:
      (i) laminated glass having a first glass plate to be disposed on an outer side of a vehicle body, a second glass plate to be disposed on an inner side of the vehicle body and an interlayer bonding the first glass plate and the second glass plate; and
      (ii) a molding disposed on a lower edge portion of the laminated glass;
      wherein the molding includes a first molding portion having an upper surface bonded to an inner side surface of the second glass plate, a second molding portion extending upward from the first molding and along an end surface of the lower edge portion of the laminated glass, and a third molding portion extending from the second molding portion in a forward direction of the vehicle body;
      wherein the third molding portion has an upper surface disposed at a lower position than an imaginary extension of an outer side surface of the first glass plate; and wherein the third molding portion has an engaged portion formed on an upper surface of the third molding portion or a lower surface of the third molding portion; and (b) a cowl louver having a rear end portion engageable with the third molding portion of the molding of the windshield with a molding, the rear end portion being formed in a U-shape in longitudinal section;

wherein the rear end portion of the cowl louver has an upper surface formed so as to be flush with an imaginary extension of the outer side surface of the first glass plate of the laminated glass; and wherein the rear end portion of the cowl louver has an engaging portion formed thereon, the engaging portion being engageable with an engaged portion of the third molding of the molding.

* * * * *